(12) United States Patent
Onoe et al.

(10) Patent No.: US 10,981,113 B2
(45) Date of Patent: *Apr. 20, 2021

(54) EXHAUST GAS PURIFICATION CATALYST BODY

(71) Applicant: CATALER CORPORATION, Kakegawa (JP)

(72) Inventors: Ryota Onoe, Kakegawa (JP); Yosuke Toda, Kakegawa (JP); Taku Miura, Kakegawa (JP)

(73) Assignee: CATALER CORPORATION, Kakegawa (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/644,455

(22) PCT Filed: Sep. 3, 2018

(86) PCT No.: PCT/JP2018/032633
§ 371 (c)(1),
(2) Date: Mar. 4, 2020

(87) PCT Pub. No.: WO2019/058948
PCT Pub. Date: Mar. 28, 2019

(65) Prior Publication Data
US 2021/0060487 A1    Mar. 4, 2021

(30) Foreign Application Priority Data
Sep. 21, 2017 (JP) .............................. JP2017-180851

(51) Int. Cl.
*B01D 53/94* (2006.01)
*B01J 35/10* (2006.01)
(Continued)

(52) U.S. Cl.
CPC ....... *B01D 53/945* (2013.01); *B01D 46/0027* (2013.01); *B01D 46/2429* (2013.01);
(Continued)

(58) Field of Classification Search
CPC .............. B01D 46/2429; B01D 53/945; B01D 2255/9155; B01J 35/1076; F01N 3/022; F01N 3/2828; F01N 2510/06
(Continued)

(56) References Cited

U.S. PATENT DOCUMENTS 10,022,671 B2 * 7/2018 Sekine .................... B01D 53/94
10,086,363 B2 * 10/2018 Onoe ....................... B01J 23/63
(Continued)

FOREIGN PATENT DOCUMENTS

EP    3162428 A1    5/2017
JP    2005-224667 A    8/2005
(Continued)

OTHER PUBLICATIONS

Sep. 8, 2020 Extended European Search Report issued in International Patent Application No. EP18858254.8.
(Continued)

*Primary Examiner* — Tom P Duong
(74) *Attorney, Agent, or Firm* — Oliff PLC

(57) ABSTRACT

Provided is an exhaust gas purification catalyst body that can improve exhaust gas purification performance while maintaining favorable PM collection performance. The exhaust gas purification catalyst body includes a base of a wall flow structure having an inlet side cell, an outlet side cell, and porous partition wall, and a catalyst layer that is formed in the partition wall that is in contact with the inlet side cell or the outlet side cell. The catalyst layer is formed in a region of at least 50% of the thickness of the partition wall from a
(Continued)

surface of the partition wall, and held on the surface of internal pores in the partition wall in the region.

7 Claims, 5 Drawing Sheets

(51) Int. Cl.
  *B01D 46/00* (2006.01)
  *F01N 3/022* (2006.01)
  *F01N 3/035* (2006.01)
  *B01D 46/24* (2006.01)
  *F01N 3/10* (2006.01)
  *F01N 3/28* (2006.01)
  *B01J 35/04* (2006.01)

(52) U.S. Cl.
  CPC ........... *B01J 35/04* (2013.01); *B01J 35/1076* (2013.01); *F01N 3/0222* (2013.01); *F01N 3/035* (2013.01); *F01N 3/101* (2013.01); *F01N 3/2828* (2013.01); *B01D 2046/2437* (2013.01); *B01D 2255/1023* (2013.01); *B01D 2255/2065* (2013.01); *B01D 2255/9155* (2013.01); *B01D 2279/30* (2013.01); *F01N 2330/06* (2013.01); *F01N 2330/36* (2013.01); *F01N 2370/02* (2013.01); *F01N 2510/06* (2013.01)

(58) Field of Classification Search
  USPC ...................... 422/177, 180; 55/523; 428/116
  See application file for complete search history.

(56) References Cited

U.S. PATENT DOCUMENTS

| | | | | |
|---|---|---|---|---|
| 2003/0093982 | A1* | 5/2003 | Suwabe | B01D 46/2459 55/523 |
| 2004/0191133 | A1* | 9/2004 | Yamaguchi | B01J 23/42 422/180 |
| 2005/0076626 | A1* | 4/2005 | Kudo | B01D 46/2429 55/523 |
| 2005/0109023 | A1* | 5/2005 | Kudo | B01J 35/04 60/311 |
| 2006/0154021 | A1* | 7/2006 | Ohno | C04B 20/1055 428/116 |
| 2007/0048494 | A1* | 3/2007 | Miyairi | B01D 46/2429 428/116 |
| 2007/0054803 | A1* | 3/2007 | Miyairi | C04B 38/0009 502/439 |
| 2008/0025882 | A1 | 1/2008 | Tsuji et al. | |
| 2008/0044319 | A1* | 2/2008 | Takahashi | B01J 35/002 422/180 |
| 2008/0070776 | A1* | 3/2008 | Yamaguchi | F01N 3/0222 502/100 |
| 2009/0087365 | A1 | 4/2009 | Klingmann et al. | |
| 2012/0009093 | A1* | 1/2012 | Mizutani | C04B 41/009 422/177 |
| 2012/0124974 | A1 | 5/2012 | Li et al. | |
| 2017/0095798 | A1 | 4/2017 | Onoe et al. | |
| 2017/0122176 | A1 | 5/2017 | Nomura et al. | |
| 2018/0133648 | A1 | 5/2018 | Sekine et al. | |

FOREIGN PATENT DOCUMENTS

| | | |
|---|---|---|
| JP | 2007-185571 A | 7/2007 |
| JP | 2009-082915 A | 4/2009 |
| JP | 2009-106922 A | 5/2009 |
| JP | 2014-509244 A | 4/2014 |
| JP | 2014-094360 A | 5/2014 |
| JP | 2016-539803 A | 12/2016 |
| JP | 2017-072003 A | 4/2017 |
| JP | 2017-072033 A | 4/2017 |
| JP | 2017-082745 A | 5/2017 |
| WO | 2007083779 A1 | 7/2007 |
| WO | 2015/082892 A2 | 6/2015 |
| WO | 2017/163984 A1 | 9/2017 |

OTHER PUBLICATIONS

Dec. 7, 2020 Office Action issued in Indian Patent Application No. 202027016732.
Nov. 20, 2018 International Search Report issued in International Patent Application No. PCT/JP2018/032633.

* cited by examiner

EXHAUST GAS PURIFICATION CATALYST BODY

TECHNICAL FIELD

The present invention relates to an exhaust gas purification catalyst body, and specifically, an exhaust gas purification catalyst body that purifies an exhaust gas discharged from an internal combustion engine such as a gasoline engine.

This application claims the benefit of foreign priority to Japanese Patent Application No. 2017-180851, filed 21 Sep. 2017, the content of which is herein incorporated by reference in its entirety.

BACKGROUND ART

In the related art, an exhaust gas purification catalyst for purifying components such as hydrocarbons (HC), carbon monoxide (CO), nitrogen oxides (NOx), and the like contained in exhaust gas is generally provided in an exhaust passage of an internal combustion engine. It is known that the exhaust gas contains particulate matter (PM) containing carbon as a main component, and ash composed of incombustible components in addition to gas components, which cause air pollution. Therefore, in addition to exhaust gas components such as HC, CO, and NOx, regulations on the amount of particulate matter discharged are becoming stricter year by year. Thus, a technology for collecting and removing such particulate matter from exhaust gas has been proposed.

For example, a particulate filter for collecting particulate matter is provided in an exhaust passage of an internal combustion engine in combination with an exhaust gas purification catalyst. For example, since a gasoline engine discharges, together with exhaust gas, a certain amount of particulate matter that is smaller than that of a diesel engine, a gasoline particulate filter (GPF) is installed in an exhaust passage in some cases. Regarding such a particulate filter, a so-called wall flow structure in which a base is composed of a plurality of porous cells, and inlets and outlets of the plurality of cells are alternately closed is known (Patent Literature 1 and 2). In the wall flow type particulate filter, exhaust gas flowing from the cell inlets passes through porous cell partition walls while moving in the cells and is discharged to the cell outlets. Thus, while exhaust gas passes through the porous cell partition walls, particulate matter is collected in the pores in the partition walls.

CITATION LIST

Patent Literature

[Patent Literature 1] Japanese Patent Application Publication No. 2009-82915
[Patent Literature 2] Japanese Patent Application Publication No. 2007-185571

SUMMARY OF INVENTION

Technical Problem

In recent years, in order to have greater compactness for an exhaust gas purification function and improve performance, integrating the exhaust gas purification catalyst and a particulate filter to form a filter catalyst in which a noble metal catalyst is supported on the particulate filter has been considered. For example, Patent Literature 1 describes a filter catalyst in which a palladium layer is disposed as a noble metal catalyst in partition walls and a rhodium layer is laminated on the outside (surface) of the partition walls. In addition, Patent Literature 2 discloses a filter catalyst in which a platinum layer and a rhodium layer as noble metal catalysts are separately supported in internal pores in partition walls. However, when a catalyst layer is simply provided in pores of the partition walls without any specific thoughts as in the related art, pores in the partition walls are blocked by the catalyst layer, and thus the PM collection performance may be adversely influenced. In addition, the use efficiency of the catalyst layer is poor and is not sufficient to realize further improvement in purification performance.

The present invention has been made in view of the above circumstances and a main object of the present invention is to provide an exhaust gas purification catalyst body that can further improve purification performance while maintaining favorable PM collection performance in an exhaust gas purification catalyst body having a wall flow structure.

Solution to Problem

The inventors conducted extensive studies in order to address the above problems, and as a result, speculate that, in an exhaust gas purification catalyst body as a filter catalyst having a wall flow structure in which a catalyst layer is formed in internal pores of a partition wall, if small pores in the partition wall are filled with the catalyst layer, the PM collection rate tends to decrease. Further, it was found that, when a specific proportion of small pores not filled with the catalyst layer is maintained and the catalyst layer is disposed preferentially in large pores, it is possible to effectively improve exhaust gas purification performance while maintaining favorable PM collection performance, and the present invention was completed.

That is, the exhaust gas purification catalyst body according to the present invention is an exhaust gas purification catalyst body which is disposed in an exhaust passage of an internal combustion engine and purifies exhaust gas discharged from the internal combustion engine, the catalyst body including a base having a wall flow structure including an inlet side cell in which only an end on the exhaust gas inflow side is open, an outlet side cell which is adjacent to the inlet side cell and in which only an end on the exhaust gas outflow side is open, and a porous partition wall that partitions the inlet side cell and the outlet side cell, and a catalyst layer that is formed in the partition wall. The catalyst layer is formed in a region of at least 50% of the thickness of the partition wall from a surface of the partition wall that is in contact with at least one cell of the inlet side cell and the outlet side cell, and held on the surface of internal pores in the partition wall in the region. Among internal pores in the partition wall, an average filling rate A of the catalyst layer held in pores having a pore diameter of 5 μm or more and less than 10 μm, an average filling rate B of the catalyst layer held in pores having a pore diameter of 10 μm or more and less than 20 μm, and an average filling rate C of the catalyst layer held in pores having a pore diameter of 20 μm or more satisfy the following relationships: A<B<C, A≤40%, B≤40%, and among pores having a pore diameter of 5 μm or more and less than 20 μm, a proportion of pores having a catalyst layer filling rate of 75% or more is 35% or less by number. According to the exhaust gas purification catalyst body with such a configuration, it is possible to maintain favorable PM collection performance and effectively improve exhaust gas purification performance.

In a preferable aspect of the exhaust gas purification catalyst body disclosed here, the average filling rate C of the catalyst layer held in pores having a pore diameter of 20 μm or more is C≤45%. It is thereby possible to increase both the PM collection performance and exhaust gas purification performance to a higher level.

In a preferable aspect of the exhaust gas purification catalyst body disclosed here, the average filling rate B of the catalyst layer held in the pores having a pore diameter of 5 μm or more and less than 20 μm is 3% or more larger than the average filling rate A of the catalyst layer held in pores having a pore diameter of 5 μm or more and less than 10 μm. Accordingly, it is possible to more efficiently purify exhaust gas that flows through internal pores in the partition wall.

In a preferable aspect of the exhaust gas purification catalyst body disclosed here, the average filling rate C of the catalyst layer held in pores having a pore diameter of 20 μm or more is 1% or more larger than the average filling rate B of the catalyst layer held in pores having a pore diameter of 10 μm or more and less than 20 μm. When a large amount of catalyst layer is disposed in large pores having a pore diameter of 20 μm or more in this manner, it is possible to efficiently purify exhaust gas that flows through pores in the partition wall. Therefore, the above effects can be exhibited more favorably.

In a preferable aspect of the exhaust gas purification catalyst body disclosed here, the average filling rate A is 10%≤A≤35%, the average filling rate B is 15%≤B≤40%, and the average filling rate C is 20%≤C≤45%. In this manner, when there are differences in the average filling rates in the above ranges according to each pore diameter range, it is thereby possible to increase both the PM collection performance and exhaust gas purification performance to a higher level.

In a preferable aspect of the exhaust gas purification catalyst body disclosed here, a sum of volumes of pores having a diameter of 10 μm or less measured in the base including the catalyst layer using a mercury injection method is larger than a sum of volumes of pores having a diameter of 10 μm or less measured in the base only (without a catalyst layer) using a mercury injection method. In the exhaust gas purification catalyst body having the above pore diameter distribution, the effects of application of the present invention can be more suitably exhibited.

In a preferable aspect of the exhaust gas purification catalyst body disclosed here, the internal combustion engine is a gasoline engine. In the gasoline engine, the temperature of exhaust gas is relatively high, and PM is unlikely to deposit in the partition wall. Therefore, when the internal combustion engine is a gasoline engine, the above effects are more effectively exhibited.

DESCRIPTION OF EMBODIMENTS

Hereinafter, preferred embodiments of the present invention will be described with reference to the drawings. Here, components other than those particularly mentioned in this specification but necessary for implementation of the present invention (for example, general matters related to a disposition of an exhaust gas purification catalyst body in an automobile) can be recognized by those skilled in the art as design matters based on the related art in the field. The present invention can be implemented based on the content disclosed in this specification and common general technical knowledge in the field. Here, the term "A to B" indicating a numerical range in this specification refers to "A or more and B or less."

Figure 1:
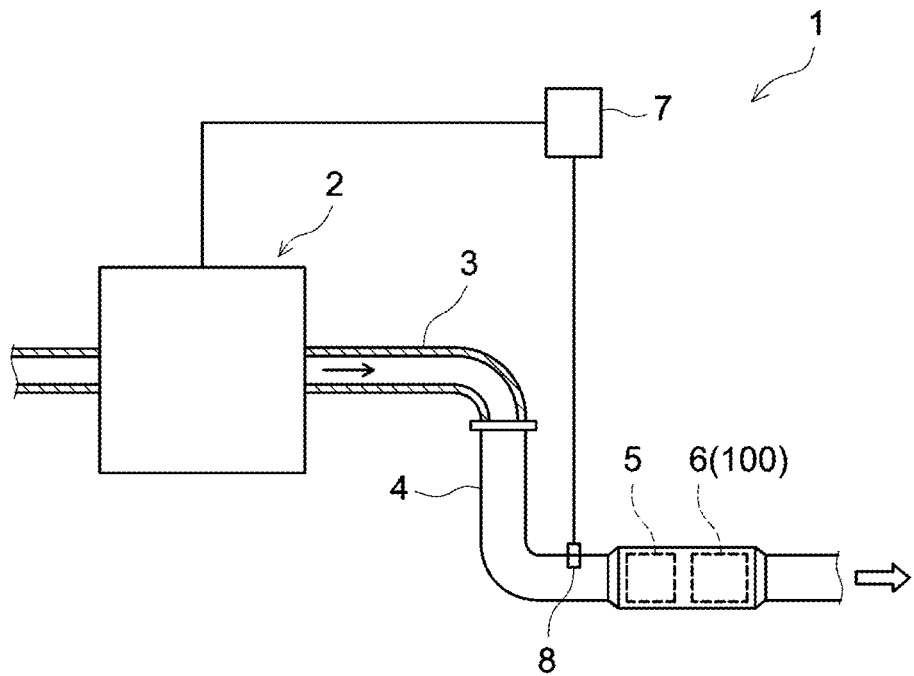
FIG. 1 is a diagram schematically showing a disposition of an exhaust gas purification catalyst body according to one embodiment in an exhaust path.

First, an outline of an exhaust gas purification catalyst body according to one embodiment of the present invention will be described. FIG. 1 is a diagram schematically showing an internal combustion engine (engine) 2 and an exhaust gas purification device 1 provided in an exhaust system of the internal combustion engine 2. An exhaust gas purification catalyst body 100 disclosed here is provided in the exhaust system of the internal combustion engine 2 as one component of the exhaust gas purification device 1.

An air-fuel mixture containing oxygen and a fuel gas is supplied to the internal combustion engine 2. The internal combustion engine 2 converts thermal energy generated when the air-fuel mixture is combusted into kinetic energy. The air-fuel mixture combusted in this case becomes exhaust gas and is discharged to an exhaust path. The internal combustion engine 2 having the configuration shown in FIG. 1 is a main constituent of an automobile gasoline engine.

The exhaust system of the internal combustion engine 2 will be described. The internal combustion engine 2 is connected to an exhaust path at an exhaust port (not shown). The exhaust path in FIG. 1 includes an exhaust manifold 3 and an exhaust pipe 4. The internal combustion engine 2 is connected to the exhaust pipe 4 via the exhaust manifold 3. Thus, exhaust gas flows through the exhaust pipe 4. The arrow in the drawing indicates an exhaust gas flow direction. Here, in this specification, along the exhaust gas flow, the side close to the engine 2 may be referred to as the upstream side, and the side far from the engine 2 may be referred to as the downstream side.

The exhaust gas purification device 1 includes a catalyst part 5, a filter part 6, an engine control unit (ECU) 7, and a sensor 8. The exhaust gas purification device 1 purifies harmful components (for example, carbon monoxide (CO), hydrocarbons (HC), and nitrogen oxides (NOx)) contained in the discharged exhaust gas and collects particulate matter (PM) contained in exhaust gas.

The catalyst part 5 and the filter part 6 are provided in the exhaust pipe 4 that communicates with the engine 2. The catalyst part 5 is configured to be able to purify three components (NOx, HC, CO) contained in exhaust gas. The type of catalyst contained in the catalyst part 5 is not particularly limited. The catalyst part 5 may include a catalyst on which a noble metal, for example, platinum (Pt), palladium (Pd), or rhodium (Rd), is supported. Here, the catalyst part 5 may further include a downstream catalyst part (not shown) in the exhaust pipe 4 downstream from the filter part 6. Since a specific configuration of the catalyst part 5 does not characterize the present invention, details thereof will be omitted here.

Figure 2:
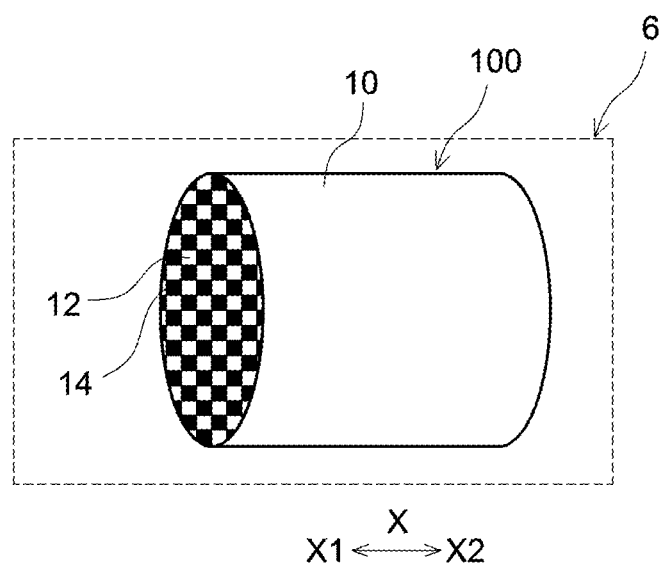
FIG. 2 is a perspective view schematically showing the exhaust gas purification catalyst body according to one embodiment.

The filter part 6 is provided downstream from the catalyst part 5. As shown in FIG. 2, the filter part 6 includes the exhaust gas purification catalyst body 100 disclosed here. The exhaust gas purification catalyst body 100 includes a catalyst in a gasoline particulate filter (GPF) that can collect and remove particulate matter (hereinafter simply referred to as "PM") contained in exhaust gas. The exhaust gas purification catalyst body 100 according to the present embodiment will be described below in detail.

Figure 3:
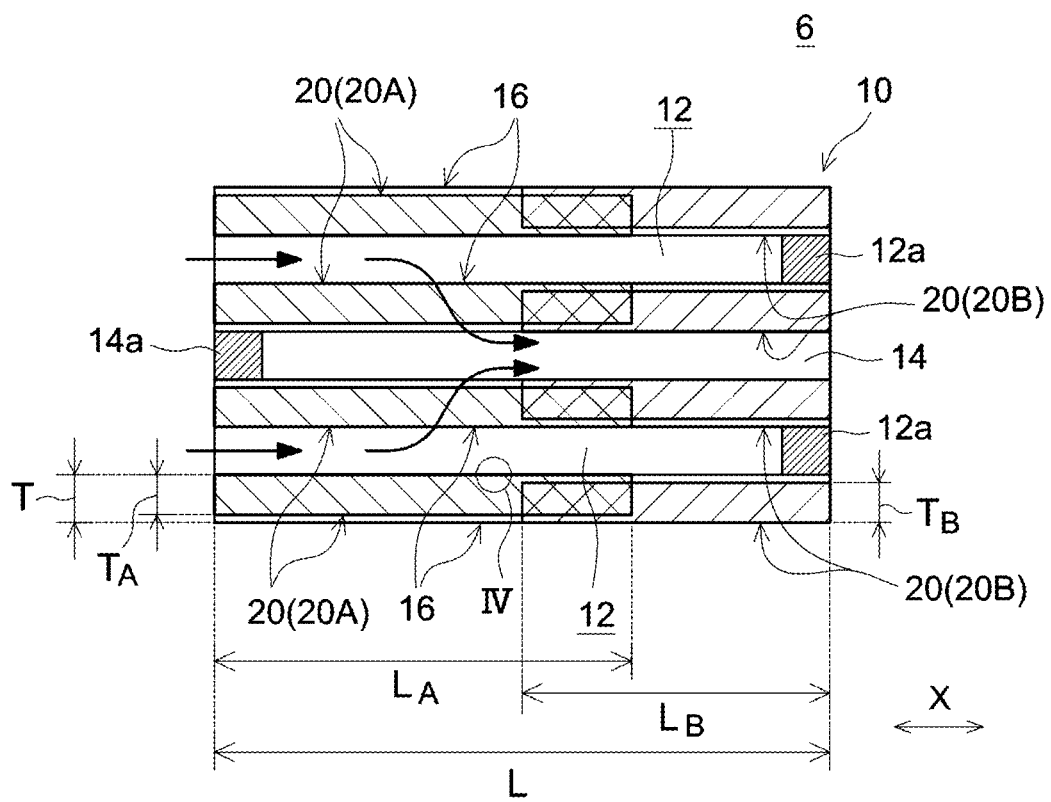
FIG. 3 is a cross-sectional view schematically showing a cross section of the exhaust gas purification catalyst body according to one embodiment.
Figure 4:
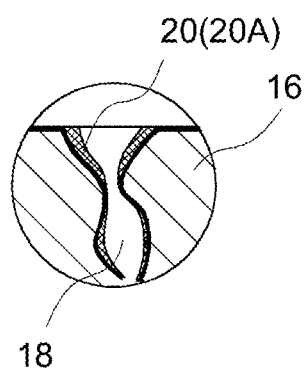
FIG. 4 is a diagram schematically showing a cross section of an enlarged IV region in FIG. 3.

FIG. 2 is a perspective view of the exhaust gas purification catalyst body 100 according to one embodiment. X in FIG. 2 indicates a first direction of the exhaust gas purification catalyst body 100. The exhaust gas purification catalyst body 100 is installed in the exhaust pipe 4 so that the first direction is an exhaust gas flow direction in the exhaust gas purification catalyst body 100. For convenience, within the first direction X, one direction X1 may be referred to as an exhaust gas inflow side (upstream) and the other direction X2 may be referred to as an exhaust gas outflow side (downstream). FIG. 3 is a schematic view in which a part of a cross section of the exhaust gas purification catalyst body 100 cut in the first direction X is enlarged. FIG. 4 is an enlarged schematic view in which an IV region in FIG. 3 is enlarged. As shown in FIG. 2 to FIG. 4, the exhaust gas purification catalyst body 100 disclosed here includes a base 10 having a wall flow structure and a catalyst layer 20. Hereinafter, the base 10 and the catalyst layer 20 will be described in this order.

<Base 10>

Regarding the base 10, various materials and forms used for this type of application in the related art can be used. For example, a base formed of a ceramic such as cordierite, silicon carbide (SiC) or an alloy (stainless steel, etc.) can be suitably used. As one example, a base of which the external form is cylindrical (the present embodiment) may be exemplified. However, the external form of the entire base may be an elliptical columnar shape or a polygonal columnar shape in place of a cylindrical shape. The base 10 typically has a so-called honeycomb structure. Cells (cavities) in the honeycomb structure extend in the first direction X. The cells include inlet side cells 12 and outlet side cells 14 adjacent to the inlet side cells 12. The base 10 includes a porous partition wall 16 that partitions the inlet side cells 12 and the outlet side cells 14. In this specification, the size of a component such as the base 10 in the first direction X is the length.

<Inlet Side Cells 12 and Outlet Side Cells 14>

The inlet side cells 12 are cells in which the end on the exhaust gas inflow side is open and the outflow side is blocked. The outlet side cells 14 are cells which are positioned adjacent to the inlet side cells 12 and in which the end on the exhaust gas outflow side is open and the inflow side is blocked. In this embodiment, in the inlet side cells 12, the end on the exhaust gas outflow side is sealed with a sealing part 12a, and in the outlet side cells 14, the end on the exhaust gas inflow side is sealed with a sealing part 14a. The sealing parts 12a and 14a are air-tightly fixed to the partition wall 16 to be described below. The inlet side cells 12 and the outlet side cells 14 may be set to have an appropriate shape and size in consideration of a flow rate and components of an exhaust gas supplied to the exhaust gas purification catalyst body 100. For example, the shapes of the cross section (hereinafter simply referred to as a "cross section") of the inlet side cells 12 and the outlet side cells 14 orthogonal the first direction X may include various geometric shapes, for example, a rectangular form such as a square, a parallelogram, a rectangle, and a trapezoid, a triangle, other polygons (for example, hexagon, octagon), and a circle. In addition, these may have a structure in which cross-sectional areas of the inlet side cells 12 and a cross-sectional area of the outlet side cells 14 in the cross section is the same or may have a structure (high ash capacity (HAC)) in which cross-sectional areas of the inlet side cells 12 and a cross-sectional area of the outlet side cells 14 in the cross section are different. In the present embodiment, the inlet side cells 12 and the outlet side cells 14 are arranged in a checkered pattern.

<Partition Wall 16>

The partition wall 16 is disposed between the inlet side cells 12 and the outlet side cells 14. The partition wall 16 is configured to surround the cells 12 and 14 in the cross section. The partition wall 16 extends in the first direction X. The inlet side cells 12 and the outlet side cells 14 are formed and separated by the partition wall 16. The partition wall 16 has a porous structure through which exhaust gas can pass. The porosity of the partition wall 16 is not particularly limited, but it is appropriately about 40% to 70%, and preferably 55% to 65%. If the porosity of the partition wall 16 is too small, this is not preferable because pressure loss may increase. On the other hand, if the porosity of the partition wall 16 is too large, this is not preferable because the mechanical strength of the exhaust gas purification catalyst body 100 tends to decrease. Such a porosity of the partition wall 16 is also suitable in consideration of disposing a slurry to be described below preferentially in large pores in the partition wall 16. In addition, the average pore diameter of the partition wall 16 is not particularly limited, but it is about 5 $\mu$m to 50 $\mu$m, for example, 10 $\mu$m to 30 $\mu$m, preferably 10 $\mu$m to 25 $\mu$m, in consideration of PM collection efficiency and reducing an increase in pressure loss. Such an average pore diameter of the partition wall 16 is also suitable in consideration of disposing a slurry to be described below preferentially in large pores in the partition wall 16. The thickness of the partition wall 16 is not particularly limited, and it may be about 0.2 mm to 1.6 mm. Within such a range of the thickness of the partition wall, an effect of reducing an increase in pressure loss can be obtained without impairing PM collection efficiency. Such a thickness of the partition wall 16 is also suitable in consideration of disposing a slurry to be described below preferentially in large pores in the partition wall 16. Here, the thickness of the partition wall 16 is a size corresponding to the distance between the inlet side cells 12 and the outlet side cells 14 in the cross section. In addition, the thickness of the catalyst layer 20 to be described below is a size measured in the thickness direction of the of the partition wall 16.

Here, the "average pore diameter" for the porous partition wall 16 in this specification is a median diameter (D50) based on a particle size distribution of area-equivalent circle diameters of N pores virtually separated based on cross-sectional image analysis of a base according to observation under an electron microscope to be described below.

<Catalyst Layer 20>

As shown in FIG. 3, the catalyst layer 20 is provided in the porous partition wall 16. More specifically, as shown in FIG. 4, the catalyst layer 20 is held on a wall surface of an internal pore 18 in the partition wall 16. In this embodiment, the catalyst layer 20 includes, in the first direction X on the exhaust gas inflow side, an upstream catalyst layer 20A disposed in an upstream part including the end on the exhaust gas inflow side of the base 10 and a downstream catalyst layer 20B disposed in a downstream part including the end of the exhaust gas outflow side of the base 10.

In the thickness direction of the partition wall 16, the upstream catalyst layer 20A is formed in a region of at least 50% and preferably in a region of 70% to 100% of the thickness T of the partition wall 16 from the surface of the partition wall 16 that faces the inlet side cell 12 toward the outlet side cells 14. That is, when the thickness from the surface of the partition wall 16 that faces the inlet side cell 12 in the upstream catalyst layer 20A is set as $T_A$, the upstream catalyst layer 20A is provided so that $T_A$ is 0.5T to 1T, and preferably $T_A$ is 0.7T to 1T. In addition, in the thickness direction of the partition wall 16, the downstream catalyst layer 20B is formed in a region of at least 50%, and preferably 70% to 100% of the thickness T of the partition wall 16 from the surface of the partition wall 16 that faces the outlet side cell 14 toward the inlet side cells 12. That is, when the thickness from the surface of the partition wall 16 that faces the outlet side cell 14 of the downstream catalyst layer 20B is set as $T_B$, the downstream catalyst layer 20B is provided so that $T_B$ is 0.5T to 1T, and preferably $T_B$ is 0.7T to 1T. In other words, both the upstream catalyst layer 20A and the downstream catalyst layer 20B are formed in a region of at least 50% of the thickness T of the partition wall 16 from the surface of the partition wall 16 in contact with the inlet side cell 12 or the outlet side cell 14 (0.5T≤$T_A$, 0.5T≤$T_B$). In this manner, when the catalyst layer 20 is formed in a region of at least 50% of the thickness T of the partition wall 16, it is possible to favorably maintain PM collection performance and effectively improve exhaust gas purification performance compared to conventional filters in which the relationships of 0.5 T $T_A$, and 0.5T≤$T_B$ are not satisfied.

In the present embodiment, the upstream catalyst layer 20A is formed in a part of at least 50% of a full length L of the base 10, for example, formed in a part corresponding to 50% to 100%, preferably 70% to 100% from the end on the exhaust gas inflow side of the base 10 toward the downstream side. That is, when the length from the end on the exhaust gas inflow side of the base 10 of the upstream catalyst layer 20A is set as $L_A$, the upstream catalyst layer 20A is provided so that $L_A$ is 0.5 L to 1 L, and preferably $L_A$ is 0.7 L to 1 L. In addition, the downstream catalyst layer 20B is formed in a part of up to 70% of the full length L of the base 10, for example, 0% to 70%, and typically formed in a part corresponding to 10% to 50%, from the end on the exhaust gas outflow side of the base 10 toward the upstream side. That is, when the length from the end on the exhaust gas outflow side of the base 10 of the downstream catalyst layer 20B is set as $L_B$, the downstream catalyst layer 20B is provided so that $L_B$ is 0 L to 0.7 L, and preferably $L_B$ is 0.1 L to 0.5 L. The downstream catalyst layer 20B may be formed so that it overlaps the upstream catalyst layer 20A in the lengthwise direction (axial direction) of the base 10 (that is, L<$L_A$+$L_B$), or may be formed so that it does not overlap the upstream catalyst layer 20A (that is, $L_A$+$L_B$ L).

Here, at least one of the upstream catalyst layer 20A and the downstream catalyst layer 20B may be provided, and either the upstream catalyst layer 20A or the downstream catalyst layer 20B may be provided. Since the upstream catalyst layer 20A and the downstream catalyst layer 20B have the same configuration except for different distribution regions in the partition wall 16, they will be collectively described as the catalyst layer 20 hereinafter.

In the exhaust gas purification catalyst body 100 disclosed here, among internal pores in the partition wall 16, the average filling rate A of the catalyst layer 20 held in pores having a pore diameter of 5 μm or more and less than 10 μm, the average filling rate B of the catalyst layer 20 held in pores having a pore diameter of 10 μm or more and less than 20 μm, and the average filling rate C of the catalyst layer 20 held in pores having a pore diameter of 20 μm or more satisfy the following relationships:

A<B<C;

A≤40%

B≤40%;

and among pores having a pore diameter of 5 μm or more and less than 20 μm, a proportion of pores in which the filling rate of the catalyst layer is 75% or more is 35% or less by number. According to the exhaust gas purification device with such a configuration, it is possible to maintain favorable PM collection performance and effectively improve exhaust gas purification performance. The reason why such effects are obtained need not be considered to be limited, but, for example, can be conceived to be the following.

That is, PM contained in exhaust gas diffuses into the partition walls and is trapped mainly in small pores (typically, pores having a pore diameter of less than 20 μm). Therefore, when small pores are filled with the catalyst layer in advance, the PM collection rate tends to decrease. On the other hand, in a filter in which the average filling rates A and B of the catalyst layer 20 held in small pores having a pore diameter of 5 μm or more and less than 10 μm and small pores having a pore diameter of 10 μm or more and less than 20 μm are set to 40% or less, respectively and a proportion of pores having a filling rate of 75% or more in such small pores is 35% or less by number, the catalyst layer does not fill small pores having a relatively small pore diameter, and decrease in PM collection performance is evenly and effectively reduced. In addition, large pores having a relatively large pore diameter have a larger exhaust gas flow path and a higher exhaust gas flow rate than small pores. Therefore, when the catalyst layer is disposed preferentially in large pores having a high exhaust gas flow rate, opportunities for contact between the catalyst layer and exhaust gas increase, and exhaust gas is efficiently purified. This is considered to contribute to improving purification performance.

The average filling rate C of the catalyst layer held in pores having a pore diameter of 20 μm or more is not particularly limited as long as it is larger than the average filling rate B of the catalyst layer held in pores having a pore diameter of 10 μm or more and less than 20 μm. For example, the average filling rate C of the catalyst layer held in pores having a pore diameter of 20 μm or more is preferably 0.3% or more larger and more preferably 0.5% or more larger than the average filling rate B of the catalyst layer held in pores having a pore diameter of 10 μm or more and less than 20 µm. The exhaust gas purification catalyst body 100 disclosed here can be preferably implemented, for example, in an aspect in which the average filling rate C is 1% or more larger than the average filling rate B. In some embodiments, for example, the average filling rate C may be 4% or more and typically 8% or more larger than the average filling rate B. Thereby, better exhaust gas purification performance can be realized. In addition, a value obtained by subtracting the average filling rate B from the average filling rate C (that is, C−B) is preferably 30% or less, more preferably 25% or less, and most preferably 20% or less. For example, C−B may be 16% or less, 14% or less, or 10% or less. A specific example of the average filling rate C is preferably 20% C and more preferably 25% C in order to more favorably exhibit an effect obtained by making the average filling rate C larger than the average filling rates A and B (for example, an exhaust gas purification performance improving effect). The upper limit of the average filling rate C is not particularly limited, but it is about C≤60%, typically C≤50%, and preferably C≤45% in consideration of PM collection performance and reducing an increase in pressure loss. The technology disclosed here can be preferably implemented in an aspect in which the average filling rate C of the catalyst layer in the exhaust gas purification catalyst body 100 is 20%≤C≤45% (preferably, 25%≤C≤45%).

The average filling rate B of the catalyst layer held in pores having a pore diameter of 10 µm or more and less than 20 µm may be smaller than the average filling rate C of the catalyst layer held in pores having a pore diameter of 20 µm or more and larger than the average filling rate A of the catalyst layer held in pores having a pore diameter of 5 µm or more and less than 10 µm. For example, the average filling rate B of the catalyst layer held in pores having a pore diameter of 10 µm or more and less than 20 µm is preferably 1% or more larger and more preferably 3% or more larger than the average filling rate A of the catalyst layer held in pores having a pore diameter of 5 µm or more and less than 10 µm. Thereby, better exhaust gas purification performance can be realized. In some embodiments, for example, the average filling rate B may be 3.5% or more larger and typically 4% or more larger than the average filling rate A. In addition, a value obtained by subtracting the average filling rate A from the average filling rate B (that is, B−A) is preferably 20% or less, more preferably 15% or less, and most preferably 10% or less. In some embodiments, for example, B−A may be 8% or less, and typically 5% or less. A specific example of the average filling rate B is about B≤40%, preferably B≤38%, and typically B≤35% in order to realize a filter having better PM collection performance and the like. In some embodiments, for example, the average filling rate B may be B≤30% and typically B≤25%. The lower limit of the average filling rate B is not particularly limited, but it is preferably 10%≤B, more preferably 15%≤B, for example 18%≤B, and typically 20%≤B in order to realize a filter catalyst having better purification performance and the like. The technology disclosed here can be preferably implemented in an aspect in which the average filling rate C of the catalyst layer in the exhaust gas purification catalyst body is 15%≤B≤40% (preferably 20%≤B≤35%).

The average filling rate A of the catalyst layer held in pores having a pore diameter of 5 µm or more and less than 10 µm is not particularly limited as long as it satisfies the relationship of A<B<C with the average filling rates B and C, and A≤40%. The average filling rate A is preferably A≤35%, and more preferably A≤32% in order to realize a filter having better PM collection performance and the like.

In some embodiments, for example, the average filling rate A may be A≤25%, and typically B≤20% (for example, B≤18%). The lower limit of the average filling rate A is not particularly limited, but it is preferably 5%≤A, more preferably 8%≤B, for example, 10%≤B, and typically 12%≤B, in order to obtain favorable exhaust gas purification performance and the like. The technology disclosed here can be preferably implemented in an aspect in which the average filling rate A of the catalyst layer in the exhaust gas purification catalyst body is 10%≤A≤35% (preferably 15%≤A≤32%).

A proportion P of pores in which the filling rate of the catalyst layer is 75% or more among pores having a pore diameter of 5 µm or more and less than 20 µm is about 35% or less by number. Thereby, it is possible to suppress a decrease in the PM collection rate. The proportion P of pores having a filling rate of 75% or more among pores having a pore diameter of 5 µm or more and less than 20 µm is preferably 30% or less by number, more preferably 28% or less by number, and most preferably 25% or less by number. In some embodiments, the proportion P may be, for example, 20% or less by number, and typically 15% or less by number (for example, 10% or less by number). The lower limit of the proportion P is not particularly limited, but it is appropriately about 1% or more by number. In consideration of ease of production, exhaust gas purification performance, and the like, the proportion P is preferably 3% or more by number, and more preferably 5% or more by number. In some embodiments, the proportion P of pores having a filling rate of 75% or more among pores having a pore diameter of 5 µm or more and less than 20 µm may be substantially 0% by number.

Here, in this specification, the pore diameter of pores provided in the partition walls and the filling rate of the catalyst layer held in the pores are calculated as follows. That is, (1) Internal pores included in a cross-sectional SEM image or a cross-sectional TEM image of a partition wall are observed using a scanning electron microscope (SEM) or a transmission electron microscope (TEM), and separation of pores starts from parts in which the largest pore diameter is obtained in the image.

(2) When pores are connected, the pores are partitioned at a portion where the diameter is reduced to 50% of the maximum pore diameter, and separated as individual pores (in this case, the catalyst layer is treated as a pore).

(3) Then, the diameter of an ideal circle (true circle) having the same area as the area X of the pores calculated from the separated pore image is calculated as the pore diameter of the pores.

(4) In addition, the area Y of the catalyst layer held in the pores is calculated from the separated pore image, and the percentage of a value obtained by dividing the area Y of the catalyst layer by the area X of the pores (that is, 100× Y/X) is calculated as a filling rate (%) of the catalyst layer.

(5) Pores having the next largest pore diameter with respect to the pores separated in the above (1) are separated out.

Then, the processes (2) to (5) are repeated until the pore diameter of the separated pores is 5 µm or less, and thereby it is possible to obtain the pore diameter of pores provided in the partition walls and the filling rate of the catalyst layer held in the pores. Then, the average filling rate of the catalyst layer for the respective pore diameter ranges can be derived from an arithmetic average of filling rates of the catalyst layers for the respective pore diameter ranges. In addition, the number of pores S1 having a pore diameter of 5 µm or more and less than 20 µm and the number of pores S2 having a pore diameter of 5 μm or more and less than 20 μm and a filling rate of 75% or more are counted, and the proportion P can be calculated according to [(S2/S1)×100]. The pore diameter of pores and the filling rate of the catalyst layer can be obtained using image analysis software in a computer that performs predetermined processes according to a predetermined program.

Here, the pores and catalyst layer subjected to image processing in the pore image are composed of a plurality of dots (pixels), and the areas X and Y of the pores and catalyst layer can be determined from the number of dots. In addition, generally, the average filling rates A, B, and C and the proportion P are preferably calculated in three representative fields of view (three different cross sections) in order to improve measurement accuracy and reproducibility. Specifically, (A) variations (standard deviation: σ) of the average filling rates A, B, and C and the proportion P in the respective pore diameter ranges in three fields of view are calculated, and (B) when the variations of the average filling rates A, B, and C and the proportion P are within 3σ, the measurement ends. (C) When the variations of the average filling rates A, B, and C and the proportion P deviate from 3σ, the average filling rates A, B, and C and the proportion P are measured in another field of view, and (D) variations of the average filling rates A, B, and C and the proportion P of pore diameters are calculated from data in all of the fields of view. (E) The procedures (C) and (D) are repeated until the variations of the average filling rates A, B, and C and the proportion P are within 3σ. Thereby, it is possible to improve measurement accuracy and reproducibility.

<Coating Amount of Catalyst Layer>

The coating amount of the catalyst layer (refers to a value obtained by dividing the mass of the catalyst layer by the volume of the base (the total bulk volume including the volume of the cell passage)) is not particularly limited as long as the average filling rates A, B, and C and the proportion P in the respective pore diameter ranges satisfy the above relationships, but it is about 300 g/L or less, preferably 250 g/L or less, for example, 150 g/L or less, for example, 120 g/L or less, typically 100 g/L or less, per 1 L of the volume of the base. In some embodiments, for example, the coating amount of the catalyst layer may be 80 g/L or less, and typically 65 g/L or less. In such a configuration, when the average filling rate of the catalyst layer held in large pores having a large pore diameter is made larger than the average filling rate of the catalyst layer held in small pores having a small pore diameter, it is possible to reduce the coating amount of the catalyst layer in the entire filter (also reduce pressure loss and reduce costs), and effectively improve exhaust gas purification performance. Therefore, for example, despite a small amount of catalyst layer such as a coating amount per 1 L of the volume of the base that is 300 g/L or less, for example, 100 g/L or less, and typically 65 g/L or less, a high performance (for example, without causing an increase in pressure loss when exhaust gas passes through the base) exhaust gas purification catalyst body having excellent purification performance can be realized. The lower limit of the coating amount of the catalyst layer is not particularly limited, but it is preferably 30 g/L or more, more preferably 40 g/L or more, and most preferably 45 g/L or more in order to improve purification performance and the like. In some embodiments, for example, the coating amount of the catalyst layer may be 40 g/L or more and 80 g/L or less, 60 g/L or more and 80 g/L or less, or 80 g/L or more and 100 g/L or less. Here, when the catalyst layer 20 includes the upstream catalyst layer 20A and the downstream catalyst layer 20B, the coating amount (density) of the upstream catalyst layer 20A is a value obtained by dividing the mass of the upstream catalyst layer 20A by the bulk volume of the length $L_A$ part of the base. The coating amount (density) of the downstream catalyst layer 20B is a value obtained by dividing the mass of the downstream catalyst layer 20B by the bulk volume of the length $L_B$ part of the base.

Here, in this specification, "the catalyst layer is held in internal pores in the partition wall" means that the catalyst layer is mainly present in (the wall surface of internal pores) the partition walls, rather than the surface (that is, outside) of the partition walls. More specifically, for example, a cross section of the base is observed using an electron microscope, and the total coating amount of the catalyst layer is set as 100%. In this case, the coating amount on the wall surface of internal pores in the partition wall is typically 80% or more (for example, 90% or more), for example, 95% or more, preferably 98% or more, more preferably 99% or more, and particularly preferably substantially 100% (that is, there is substantially no catalyst layer on the surface of the partition wall). Therefore, for example, this is clearly distinguished from the case in which a part of the catalyst layer unintentionally penetrates into internal pores in the partition walls when the catalyst layer is disposed on the surface of the partition wall.

The catalyst contained in the catalyst layer 20 is not particularly limited as long as the average filling rates A, B, and C and the proportion P in the respective pore diameter ranges satisfy these relationships. For example, a three-way catalyst, an SCR catalyst, an NSR catalyst or a combination thereof may be used.

<Noble Metal>

The catalyst layer 20 may be a layer including a three-way catalyst. That is, the catalyst layer 20 may include a noble metal and a carrier that supports the noble metal. The noble metal contained in the catalyst layer 20 need only have a catalytic function for harmful components contained in exhaust gas. Regarding the noble metal, for example, palladium (Pd), rhodium (Rh), platinum (Pt), ruthenium (Ru), iridium (Ir), osmium (Os), or the like can be used. The content (mass) of the noble metal contained in the catalyst layer 20 is appropriately about 0.005 g or more and 10 g or less per 1 liter of the volume of the base. In order to realize a catalyst having better purification performance and the like, the content is preferably 0.05 g or more and 5 g or less, more preferably 0.1 g or more and 3 g or less, and most preferably 0.3 g or more and 1 g or less.

In a preferable aspect, the noble metal contained in the upstream catalyst layer 20A is different from the noble metal contained in the downstream catalyst layer 20B. For example, it is preferable that the upstream catalyst layer 20A include Rh. It is preferable that the downstream catalyst layer 20B include Pd. The mass ratio (Pd/Rh) of Rh included in the upstream catalyst layer 20A to Pd included in the downstream catalyst layer 20B preferably satisfies 0.1≤(Pd/Rh), and is preferably 0.5≤(Pd/Rh), more preferably 1≤(Pd/Rh), and particularly preferably 1.5≤(Pd/Rh). The mass ratio (Pd/Rh) preferably satisfies (Pd/Rh)≤20, and is preferably (Pd/Rh)≤15, more preferably (Pd/Rh)≤10, and particularly preferably (Pd/Rh)≤5.

<Carrier>

The noble metal is supported on a carrier (powder type in a typical system). The carrier on which the noble metal is supported is not limited thereto, and examples thereof include metal oxides such as alumina ($Al_2O_3$), rare earth metal oxides, alkali metal oxides, alkaline earth metal oxides, zirconia ($ZrO_2$), ceria ($CeO_2$), silica ($SiO_2$), magnesia (MgO), and titanium oxide (titania: $TiO_2$), and solid solutions thereof (for example, a ceria-zirconia ($CeO_2$—$ZrO_2$) composite oxide). Among these, alumina and/or a ceria-zirconia composite oxide is preferably used. Two or more thereof may be used in combination. Here, other materials (typically inorganic oxides) as accessory components may be added to the carrier. These may be added, for example, in the form of elements, and examples of the component that can be added to the carrier include rare earth elements such as lanthanum (La) and yttrium (Y), alkaline earth elements such as calcium, alkali metal elements, and other transition metal elements. Among the above examples, rare earth elements such as lanthanum and yttrium are preferably used as a stabilizer because they can improve a specific surface area at high temperatures without impairing a catalytic function. Such carriers may be polycrystalline or single crystals.

An amount of the noble metal supported on the carrier is not particularly limited, and is appropriately in a range of 0.01 mass % to 2 mass % (for example, 0.05 mass % to 1 mass %) with respect to the total mass of carrier that supports the noble metal of the catalyst layer 20. A method of supporting a noble metal on the carrier of the catalyst layer 20 is not particularly limited. For example, a carrier powder including $Al_2O_3$ and/or a $CeO_2$—$ZrO_2$ composite oxide can be impregnated into an aqueous solution containing a noble metal salt (for example, nitrate) or a noble metal complex (for example, a tetraamine complex), and then dried, and fired for preparation.

The catalyst layer 20 may include a NOx absorbent material having a NOx occlusion ability in addition to the above noble metal and carrier. The NOx absorbent material has a NOx occlusion ability to adsorb NOx in exhaust gas when the air-fuel ratio of exhaust gas is in a lean state with excess oxygen, and to release adsorbed NOx when the air-fuel ratio is switched to the rich side. Regarding such a NOx absorbent material, a basic material including one or two or more metals that can donate electrons to NOx can be suitably used. Examples thereof include alkali metals such as potassium (K), sodium (Na), and cesium (Cs), alkaline earth metals such as barium (Ba) and calcium (Ca), rare earths such as lanthanoids and metals such as silver (Ag), copper (Cu), iron (Fe), and iridium (In). Among these, a barium compound (for example, barium sulfate) has a high NOx occlusion ability and is suitable as a NOx absorbent material used in the exhaust gas purification catalyst body 100 disclosed here.

The catalyst layer 20 may include a metal oxide that does not support a noble metal in addition to the above noble metal and carrier. Regarding the metal oxide that does not support a noble metal, the same metal oxides as described for the carrier can be used.

<SCR Catalyst>

The catalyst layer 20 may be, for example, a layer including a selective catalytic reduction (SCR) catalyst. That is, the filter purifies nitrogen oxides ($NO_x$) in exhaust gas by supporting the SCR catalyst. The SCR catalyst is not particularly limited, and examples thereof include β-type zeolite, and SAPO (silicoaluminophosphate) zeolite. Examples of SAPO include SAPO-5, SAPO-11, SAPO-14, SAPO-17, SAPO-18, SAPO-34, SAPO-39, SAPO-42, and SAPO-47. The SCR catalyst may include an arbitrary metal component. Examples of such a metal component include copper (Cu), iron (Fe), sodium (Na), potassium (K), magnesium (Mg), calcium (Ca), cobalt (Co), nickel (Ni), zinc (Zn), silver (Ag), lead (Pb), vanadium (V), chromium (Cr), molybdenum (Mo), yttrium (Y), cerium (Ce), neodymium (Nd), tungsten (W), indium (In), and iridium (Ir). When SAPO includes the metal, NOx can be purified more efficiently. When the catalyst layer 20 includes an SCR catalyst, a reducing agent solution supply unit that supplies a reducing agent solution (for example, urea water) for generating ammonia may be disposed upstream of the exhaust pipe from the exhaust gas purification catalyst body 100.

<Method of Forming Catalyst Layer 20>

When the catalyst layer 20 is formed, a slurry for forming a catalyst layer including a powder in which a noble metal is supported on a carrier and an appropriate solvent (for example, deionized water) may be prepared.

Here, the viscosity of the slurry is an important factor in order to obtain the magnitude relationship (A<B<C) of the average filling rates of the catalyst layer described above. That is, the viscosity of the slurry may be appropriately adjusted so that it easily enters large pores (for example, pores having a pore diameter of 20 μm or more) and does not easily enter small pores (for example, pores having a pore diameter of 5 μm or more and less than 20 μm) among internal pores in the partition wall 16. In a preferable aspect, the viscosity $\eta_{400}$ of the slurry at a shear rate of 400 $s^{-1}$ is larger than 50 mPa·s and 150 mPa·s or less, and preferably 60 mPa·s or more and 110 mPa·s or less. When a slurry having such a specific viscosity is used, the slurry is disposed preferentially in large pores among internal pores in the partition wall 16, and a catalyst layer that satisfies the magnitude relationship (A<B<C) of the average filling rates described above can be stably formed. Such a viscosity is preferable in order to realize a formation region (0.7 $T \le T_A$, 0.7 $T \le T_B$) in the partition wall. In order to obtain such a viscosity of the slurry, the slurry may include a thickener or a dispersant. Regarding the dispersant, for example, polycarboxylic acid can be preferably used. When polycarboxylic acid is added, the slurry can be applied preferentially to large pores while allowing small pores to remain. The production method disclosed here can be particularly preferably implemented in an aspect in which such polycarboxylic acid is used. The weight average molecular weight (Mw) of polycarboxylic acid based on gel permeation chromatography (GPC, aqueous, in terms of polyethylene oxide) may be, for example, 1 million to 2 million. Polycarboxylic acid may be used in the form of the salt. Examples of salts include metal salts (for example, lithium salts, sodium salts, and potassium salts), and ammonium salts. Examples of thickeners include cellulose polymers such as carboxymethylcellulose (CMC), methylcellulose (MC), hydroxypropyl methylcellulose (HPMC), and hydroxyethyl methylcellulose (HEMC). The content of the thickener in the total solid content of the slurry is not particularly limited as long as the viscosity of the slurry is within the above range, but it is about 0.1 mass % to 5 mass %, preferably 0.3 mass % to 4 mass %, and more preferably 0.5 mass % to 3 mass %. Here, the viscosity of the slurry is a viscosity that can be measured using a commercially available shear viscometer at room temperature. For example, when a standard dynamic viscoelasticity measuring device (rheometer) in the field is used, the viscosity can be easily measured under conditions of a shear rate range as described above. Here, "room temperature" refers to a temperature range of 15° C. to 35° C. and typically a temperature range of 20° C. to 30° C. (for example, 25° C.).

The average particle diameter of particles (typically, a carrier powder on which a noble metal is supported) in the slurry not particularly limited, but it is preferably about 1/50 to 1/3 of the average pore diameter (median diameter: D50) of the partition wall 16. The average particle diameter of particles in the slurry is more preferably about 1/40 or more and most preferably about 1/30 or more of the average pore diameter of the partition wall 16. The average particle diameter of particles in the slurry is more preferably about 1/5 or less and most preferably about 1/10 or less of the average pore diameter of the partition wall 16. For example, when the average pore diameter of the partition wall 16 is about 15 μm to 20 μm, the average particle diameter of particles in the slurry is about 0.3 μm or more, preferably 0.4 μm or more, and more preferably 0.5 μm or more, and about 3 μm or less, preferably 1 or less, and more preferably 0.7 μm or less. When the average particle diameter of particles in the slurry is in such a range, the slurry is likely to be disposed preferentially in large pores among internal pores in the partition wall 16. Therefore, it is possible to form a catalyst layer in which the magnitude relationship (A<B<C) of the average filling rates is satisfied more stably. Here, the average particle diameter (median diameter: D50) of particles in the slurry can be determined based on a laser diffraction and scattering method.

In the production method disclosed here, the catalyst layer 20 is formed in pores in the partition wall 16 using the slurry. The catalyst layer 20 can be formed by a suction coating method.

A catalyst layer is generally formed using an immersion method. In such a method, a base is immersed in the above slurry, the slurry is caused to penetrate the base and enter pores in the partition wall and the base is then removed, and an amount of the slurry is adjusted by air blowing, the solvent is volatilized and thus a catalyst layer is formed in pores in the partition wall. In such a method, since the slurry also enters clogged pores through which exhaust gas does not pass among pores in the partition wall, a catalyst layer that does not contribute to purification of exhaust gas is likely to be formed, and purification performance may be reduced.

On the other hand, in the suction coating method disclosed here, all or a part of the slurry is applied to an end part (hereinafter referred to as an "end F") on the exhaust gas inflow side or exhaust gas outflow side of the base, and sucked from the other end (that is, an end part on the exhaust gas outflow side or exhaust gas inflow side of the base; hereinafter referred to as an "end R") (first slurry injection). Specifically, in consideration of the viscosity of the slurry and wetness of pores in the partition wall, the slurry is sucked so that the slurry is applied to a part corresponding at least 50% (for example, 50% to 100%, preferably 70% to 95%) of the length of the base from the end F of the base toward the end R, and the slurry is applied to a region from the surface of the partition wall to at least 50% (for example, 50% to 100%, preferably 70% to 100%) of the thickness of the partition wall. In addition, as necessary, the remaining slurry is applied to the other end R of the base, and in consideration of the viscosity of the slurry and wetness of pores in the partition wall, the slurry is sucked so that the slurry is applied to a part corresponding to at most 70% (for example, 5% to 70%, more preferably 5% to 50%) of the length of the base from the end R toward the end F, and the slurry is applied to a region from the surface of the partition wall to at least 50% (for example, 50% to 100%, preferably 70% to 100%) of the thickness of the partition wall (second slurry injection). In this manner, when the slurry is caused to enter pores in the partition wall due to suction, the slurry easily enters preferentially to large pores (typically, throughholes) through which exhaust gas easily passes among pores in the partition walls and the slurry is less likely to enter small pores (typically, clogged pores) through which exhaust gas does not easily pass. Therefore, a risk of a catalyst layer that does not contribute to purification of exhaust gas being formed when an immersion method is used is eliminated or reduced, and purification performance can be improved.

The suction speed (wind speed) of the slurry is not particularly limited, but it is appropriately about 10 m/s to 80 m/s (preferably 10 m/s to 50 m/s, and more preferably 15 m/s to 25 m/s). In addition, the suction time of the slurry is not particularly limited, but it is appropriately about 0.1 seconds to 10 seconds (preferably 0.5 seconds to 5 seconds, more preferably 1 second to 2 seconds). Preferable examples of the technology disclosed here include an example in which the suction speed of the slurry is 10 m/s to 30 m/s and the suction time of the slurry is 0.5 seconds to 5 seconds; and an example in which the suction speed of the slurry is 15 m/s to 25 m/s and the suction time of the slurry is 1 second to 2 seconds. When the suction speed and the suction time of the slurry are within such ranges, the slurry is easily disposed preferentially in large pores among internal pores in the partition wall 16 and a catalyst layer in which the magnitude relationship (A<B<C) of the average filling rates is satisfied can be formed more stably.

In the production method disclosed here, after the slurry enters pores in the partition wall 16, the slurry is dried and fired at a predetermined temperature. Thereby, the catalyst layer 20 is held on the wall surface of pores in the partition wall 16. As described above, the exhaust gas purification catalyst body 100 in which a catalyst layer is formed on the wall surface of pores in the partition wall 16 can be obtained.

The exhaust gas purification catalyst body 100 obtained in this manner is formed by causing a slurry having a specific viscosity to flow preferentially into large pores in the partition wall using a suction coating method. In addition, according to the production method disclosed here, for example, the slurry is applied to the end F of the base and sucked from the other end R. In this case, the slurry is sucked so that the slurry is applied to a region from the surface of the partition wall to at least 50% of the thickness of the partition wall. In addition, as necessary, the remaining slurry is applied to the end R of the base and sucked from the other end F. In this case, the slurry is sucked so that the slurry is applied to a region from the surface of the partition wall to at least 50% of the thickness of the partition wall. In this manner, the slurry is sucked so that the slurry is applied to a region from the surface of the partition wall to at least 50% of the thickness of the partition wall, and thereby a catalyst layer in which the magnitude relationship (A<B<C) of the average filling rates and the proportion P are satisfied is stably formed, and a filter having excellent PM collection performance and purification performance can be obtained. Therefore, according to the production method disclosed here, the exhaust gas purification catalyst body 100 having a higher PM collection rate and more excellent purification performance than those in the related art can be produced.

According to the technology disclosed here, it is possible to provide a method for producing an exhaust gas purification filter in which, among internal pores in the partition walls, the average filling rate A of the catalyst layer held in pores having a pore diameter of 5 or more and less than 10 μm, the average filling rate B of the catalyst layer held in pores having a pore diameter of 10 μm or more and less than 20 μm, and the average filling rate C of the catalyst layer held in pores having a pore diameter of 20 μm or more satisfy the following relationships: A<B<C; A 40%; B 40%; and the proportion of pores having a catalyst layer filling rate of 75% or more among pores having a pore diameter of 5 μm or more and less than 20 μm is 35% or less by number.

This production method includes preparing (purchasing, producing, etc.) a base having a wall flow structure including an inlet side cell in which only the end on the exhaust gas inflow side is open, an outlet side cell adjacent to the inlet side cell and in which only the end on the exhaust gas outflow side is open, and a porous partition wall that partitions the inlet side cell and the outlet side cell; applying a slurry for forming a catalyst layer to an end F (that is, an end part on the exhaust gas inflow side or exhaust gas outflow side) of the base and sucking it from the other end R (that is, an end part on the exhaust gas outflow side or exhaust gas inflow side of the base); and drying and firing the base in which the slurry is sucked.

Here, in the slurry suction process, the slurry is sucked so that the slurry is applied to a region from the surface of the partition wall to at least 50% of the thickness of the partition wall. In addition, in a preferable aspect, in the slurry for forming a catalyst layer, the viscosity $\eta_{400}$ at a shear rate of $400\ s^{-1}$ may be set to be larger than 50 mPa·s and 150 mPa·s or less (preferably 80 mPa·s or more and 120 mPa·s or less).

The filter produced according to such a method can be suitably used as a particulate filter for an exhaust gas purification catalyst body.

As shown in FIG. 3, in the exhaust gas purification catalyst body 100, exhaust gas flows from the inlet side cells 12 of the base 10. The exhaust gas flowing from the inlet side cells 12 passes through the porous partition wall 16 and reaches the outlet side cells 14. In FIG. 3, arrows indicate a route in which exhaust gas flowing from the inlet side cells 12 passes through the partition wall 16 and reaches the outlet side cells 14. In this case, since the partition wall 16 has a porous structure and small pores are not filled with the catalyst layer 20, while exhaust gas passes through the partition wall 16, particulate matter (PM) is appropriately collected on the surface of the partition wall 16 and in pores (typically, in small pores) in the partition wall 16. In addition, as shown in FIG. 4, since the catalyst layer 20 is provided in pores of the partition wall 16, while exhaust gas passes through pores in the partition wall 16, harmful components in the exhaust gas are purified. In this case, exhaust gas is efficiently purified in the catalyst layer 20 preferentially held in large pores having a high exhaust gas flow rate. The exhaust gas that has passed through the partition wall 16 and reached the outlet side cells 14 is discharged from the opening on the exhaust gas outflow side to the outside of the exhaust gas purification catalyst body 100.

Test Example 1

Test examples related to the present invention will be described below, but the present invention is not intended to be limited to the following test examples. In this example, the following test was performed in order to confirm an influence of the viscosity of the slurry on a catalyst layer filling rate.

Example 1

A Palladium nitrate solution, an alumina powder, a ceria-zirconia composite oxide as a Ce-containing oxide, deionized water, and polycarboxylic acid were mixed to prepare a slurry S1. Next, using a suction coating device, the slurry S1 was applied to an end part (end F) on the exhaust gas inlet side of a cordierite base (wall flow type base shown in FIG. 3: a base volume of 1.3 L, a full length of 114.3 mm) and sucked from the other end R (that is, an end part on the exhaust gas outflow side of the base 10), and thus the slurry was caused to flow into pores in the partition wall. Then, drying and firing were performed and thus a catalyst layer was formed in pores of the partition wall. The viscosity $\eta_{400}$ of the slurry S1 at a shear rate of $400\ s^{-1}$ was 90 mPa·s, and the coating amount of the catalyst layer was 45 g/L. The viscosity $\eta_{400}$ of the slurry S1 was adjusted by the amount of polycarboxylic acid. As described above, an exhaust gas purification catalyst body having a catalyst layer was obtained.

Example 2

A Rhodium nitrate solution, an alumina powder, a ceria-zirconia composite oxide as a Ce-containing oxide, deionized water, and polycarboxylic acid were mixed to prepare a slurry S2. Next, using a suction coating device, the slurry S2 was applied to an end part (end F) on the exhaust gas inlet side of a cordierite base (wall flow-structured base shown in FIG. 3: a base volume of 1.3 L, a full length of 114.3 mm) and sucked from the other end R (that is, an end part on the exhaust gas outflow side of the base 10), and thus the slurry was caused to flow into pores in the partition wall. Then, drying and firing were performed and thus a catalyst layer was formed in pores of the partition wall. The viscosity $\eta_{400}$ of the slurry S2 at a shear rate of $400\ s^{-1}$ was 90 mPa·s, and the coating amount of the catalyst layer was 60 g/L. The viscosity $\eta_{400}$ of the slurry S2 was adjusted by the amount of polycarboxylic acid. As described above, an exhaust gas purification catalyst body having a catalyst layer was obtained.

Example 3

An exhaust gas purification catalyst body was produced in the same procedures as in Example 1 except that the coating amount of the catalyst layer per 1 L of the volume of the base was changed to 100 g/L.

Example 4

An exhaust gas purification catalyst body was produced in the same procedures as in Example 1 except that the viscosity $\eta_{400}$ of the slurry S1 was changed to 200 mPa·s.

Example 5

An exhaust gas purification catalyst body was produced in the same procedures as in Example 2 except that the viscosity $\eta_{400}$ of the slurry S2 was changed to 200 mPa·s.

Example 6

An exhaust gas purification catalyst body was produced in the same procedures as in Example 3 except that the viscosity $\eta_{400}$ of the slurry S1 was changed to 200 mPa·s.

Example 7

An exhaust gas purification catalyst body was produced in the same procedures as in Example 1 except that the viscosity Two of the slurry S1 was changed to 10 mPa·s.

Example 8

An exhaust gas purification catalyst body was produced in the same procedures as in Example 2 except that the viscosity Two of the slurry S2 was changed to 10 mPa·s.

Example 9

An exhaust gas purification catalyst body was produced in the same procedures as in Example 3 except that the viscosity Two of the slurry S1 was changed to 10 mPa·s.

<Filling Rate>

Figure 5:
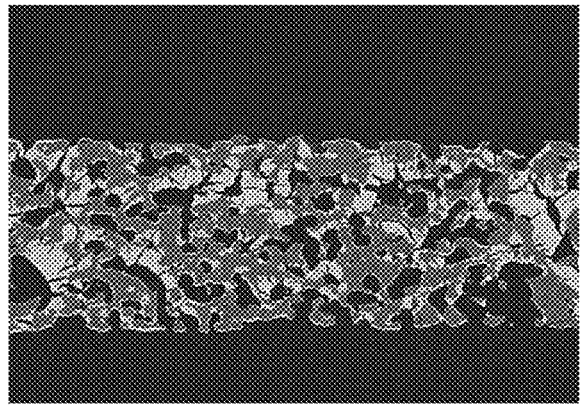
FIG. 5 shows a cross-sectional SEM image of a partition wall of Example 3.
Figure 6:
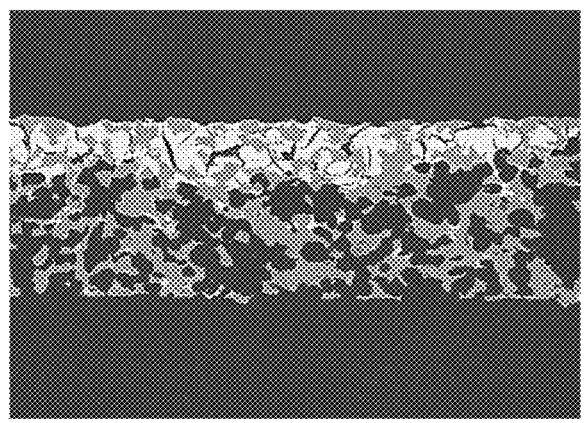
FIG. 6 shows a cross-sectional SEM image of a partition wall of Example 5.
Figure 7:
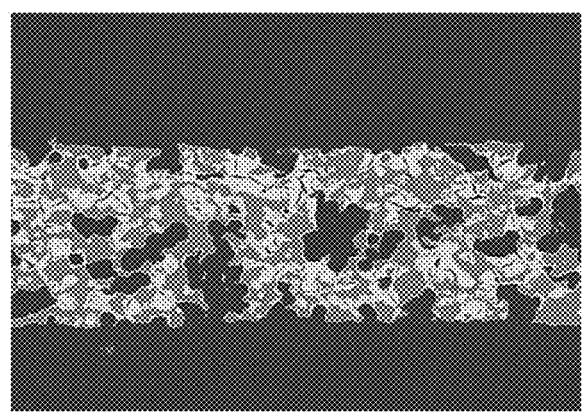
FIG. 7 shows a cross-sectional SEM image of a partition wall of Example 9.

Cross-sectional SEM images of partition walls of the exhaust gas purification catalyst bodies of the examples were captured, and the pore diameter of internal pores in the partition walls and the filling rate of the catalyst layer held in the pores were measured according to the above-described methods. Then, the filling rates of the catalyst layers for the respective pore diameter ranges were arithmetically averaged and thus the average filling rate A of the catalyst layer held in pores having a pore diameter of 5 μm or more and less than 10 μm, the average filling rate B of the catalyst layer held in pores having a pore diameter of 10 μm or more and less than 20 μm, and the average filling rate C of the catalyst layer held in pores having a pore diameter of 20 μm or more were calculated. In addition, the proportion P of pores having a filling rate of 75% or more among pores having a pore diameter of 5 μm or more and less than 20 μm was calculated. The results are shown in corresponding columns in Table 1. In addition, FIG. 5 shows a cross-sectional SEM image of the partition wall of Example 3, FIG. 6 shows a cross-sectional SEM image of the partition wall of Example 5, and FIG. 7 shows a cross-sectional SEM image of the partition wall of Example 9.

and the catalyst layer was formed preferentially in pores having a small pore diameter among internal pores in the partition walls. On the other hand, in the catalyst bodies of Examples 1 to 3 using the slurry having a viscosity $\eta_{400}$ of 90 mPa·s, most of the slurry flowed deeply into the partition wall and reached the other end R, and the catalyst layer was formed in a region from the surface of the partition wall in contact with the inlet side cell to more than at least 50% of the thickness of the partition wall. In addition, in the catalyst bodies of Examples 1 to 3, it was confirmed that the relationship of the average filling rates A, B, and C was A<B<C, and the catalyst layer was formed preferentially in pores having a large pore diameter among internal pores in the partition walls. In addition, in the catalyst bodies of Examples 1 to 3, both the average filling rates A and B were 40% or less, and the proportion of pores having a catalyst layer filling rate of 75% or more among pores having a pore diameter of 5 μm or more and less than 20 μm was 35% or less by number.

Test Example 2

In this example, the following test was performed in order to confirm an influence of a catalyst layer filling rate on catalyst performance.

Example 10

An exhaust gas purification catalyst body in which an upstream catalyst layer contained Rh and a downstream catalyst layer contained Pd was produced. Specifically, using the above slurry S2 of Example 2, suction-coating were performed on a part corresponding to 70% of the length L of the base from the end on the exhaust gas inlet side of a cordierite base (wall flow-structured base shown in FIG. 3: a base volume of 1.3 L, a full length of 114.3 mm) toward the downstream side, and drying and firing were performed and thus an upstream catalyst layer was formed in the partition wall. The coating amount of the upstream catalyst layer per 1 L of the volume of the base was 60 g/L, and the amount of Rh per base was 0.2 g. The filling rates A, B, and C of the upstream catalyst layer and the proportion P were the same as those in Example 2.

Next, using the above slurry S1 of Example 1, suction-coating were performed on a part corresponding to 50% of the length L of the base from the end on the exhaust gas outlet side of the base toward the upstream side, and drying and firing were performed, and thus a downstream catalyst

TABLE 1

|  | Viscosity $\eta_{400}$ (mPa · s) | Coating amount (g/L) | Average filling rate A (%) | Average filling rate B (%) | Average filling rate C (%) | Proportion P of pores having a filling rate of 75% or more (% by number) | Coating depth (%) |
| --- | --- | --- | --- | --- | --- | --- | --- |
| Example 1 | 90 | 45 | 16.7 | 20.5 | 25.3 | 7.1 | 50< |
| Example 2 | 90 | 60 | 24.0 | 28.3 | 29.3 | 14.6 | 50< |
| Example 3 | 90 | 100 | 30.7 | 33.8 | 43.1 | 22.0 | 100 |
| Example 4 | 200 | 45 | 22.0 | 24.0 | 24.8 | 16.7 | Surface layer part |
| Example 5 | 200 | 60 | 31.7 | 35.2 | 35.9 | 28.6 | Surface layer part |
| Example 6 | 200 | 100 | 32.4 | 40.0 | 43.1 | 35.4 | Surface layer part |
| Example 7 | 10 | 45 | 74.7 | 22.1 | 8.5 | 36.1 | 100 |
| Example 8 | 10 | 60 | 77.1 | 26.4 | 5.7 | 45.7 | 100 |
| Example 9 | 10 | 100 | 91.1 | 71.2 | 28.7 | 83.7 | 100 |

As shown in Table 1, in the catalyst bodies of Examples 4 to 6 using the slurry having a viscosity $\eta_{400}$ of 200 mPa·s, the slurry did not deeply flow into the partition wall and coated only the surface layer part. In addition, in the catalyst bodies of Examples 7 to 9 using the slurry having a viscosity $\eta_{400}$ of 10 mPa·s, it was confirmed that, although the slurry flowed deeply into the partition wall and reached the other end R (coating depth: 100%), the relationship of the average filling rate A of the catalyst layer held in pores having a pore diameter of 5 μm or more and less than 10 μm, the average filling rate B of the catalyst layer held in pores having a pore diameter of 10 μm or more and less than 20 μm, and the average filling rate C of the catalyst layer held in pores having a pore diameter of 20 μm or more satisfied A>B>C, layer was formed in the partition wall. The coating amount of the downstream catalyst layer per 1 L of the volume of the base was 45 g/L, and the amount of Pd per base was 0.5 g. As described above, an exhaust gas purification catalyst body according to Example 10 having an upstream catalyst layer and a downstream catalyst layer was obtained. The filling rates A, B, and C of the downstream catalyst layer and the proportion P were the same as those in Example 1.

Example 11

An exhaust gas purification catalyst body was produced in the same procedures as in Example 10 except that an upstream catalyst layer was formed using the above slurry S2 of Example 5 and a downstream catalyst layer was formed using the above slurry S1 of Example 4. The filling rates A, B, and C of the upstream catalyst layer and the proportion P were the same as those in Example 5, and the filling rates A, B, and C of the downstream catalyst layer and the proportion P were the same as those in Example 4.

Example 12

An exhaust gas purification catalyst body was produced in the same procedures as in Example 10 except that an upstream catalyst layer was formed using the above slurry S2 of Example 8 and a downstream catalyst layer was formed using the above slurry S1 of Example 7. The filling rates A, B, and C of the upstream catalyst layer and the proportion P were the same as those in Example 8, and the filling rates A, B, and C of the downstream catalyst layer and the proportion P were the same as those in Example 7.

In the exhaust gas purification catalyst bodies of the examples, the coating amount, the length ($L_A$ in FIG. 3) and the viscosity $\eta_{400}$ of the slurry S1 of the upstream catalyst layer, and the coating amount, the length ($L_B$ in FIG. 3) and the viscosity $\eta_{400}$ of the slurry S2 of the downstream catalyst layer are summarized in Table 2.

TABLE 2

|  | Upstream catalyst layer | | | Downstream catalyst layer | | |
| --- | --- | --- | --- | --- | --- | --- |
|  | Coating amount (g/L) | Length $L_A$ (%) | Viscosity of slurry (mPa·s) | Coating amount (g/L) | Length $L_B$ (%) | Viscosity of slurry (mPa·s) |
| Example 10 | 60 | 70 | 90 | 45 | 50 | 90 |
| Example 11 | 60 | 70 | 200 | 45 | 50 | 200 |
| Example 12 | 60 | 70 | 10 | 45 | 50 | 10 |

<Pore Diameter Distribution>

Regarding the exhaust gas purification catalyst bodies of the examples, and a filter (only a base) in which no catalyst layer was formed, a pore diameter distribution (differential pore volume distribution) was measured. Here, the differential pore volume distribution was a distribution curve in which a pore volume corresponding to a pore diameter was plotted with respect to the pore diameter (μm). The pore diameter distribution was measured using a pore distribution measuring device AutoPore IV commercially available from Micromeritics Instrument Corporation. The results are shown in FIG. 8.

Figure 8:
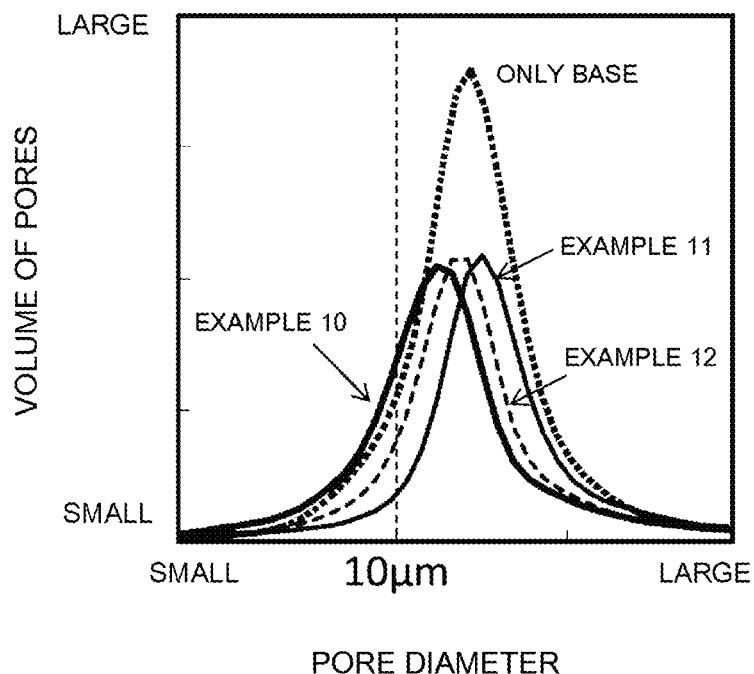
FIG. 8 is a graph showing pore diameter distributions of examples.

As shown in FIG. 8, in the exhaust gas purification catalyst body of Example 12, since the slurry was applied preferentially to small pores rather than large pores, compared to the case using only the base, the volume of small pores having a diameter of 10 μm or less tended to decrease while the volume of large pores was maintained. In addition, in the exhaust gas purification catalyst body of Example 11, since the slurry was applied to both small pores and large pores, the volumes of both small pores and large pores tended to decrease. On the other hand, in the exhaust gas purification catalyst body of Example 10, since the slurry was applied preferentially to large pores rather than small pores, compared to the case using only the base, the volume of large pores tended to decrease while the volume of small pores having a diameter of 10 μm or less was maintained. In addition, since the large pores were filled with the catalyst layer and the diameter was reduced, the volume of small pores having a diameter of 10 μm or less conversely tended to increase. In a preferable aspect, the sum X of the volumes of pores having a diameter of 10 μm or less measured in the base including the catalyst layer using a mercury injection method was larger than the sum Y of the volumes of pores having a diameter of 10 μm or less measured in the base only (without a catalyst layer, that is, a base in a stage before the catalyst layer was formed) using a mercury injection method (X> Y). The technology disclosed here was particularly advantageous because, when a catalyst layer was formed in the base, it was possible to increase the volume of small pores effective for PM collection compared to the case using only the base.

<Temperature at which a 50% Purification Rate was Reached>

Figure 9:
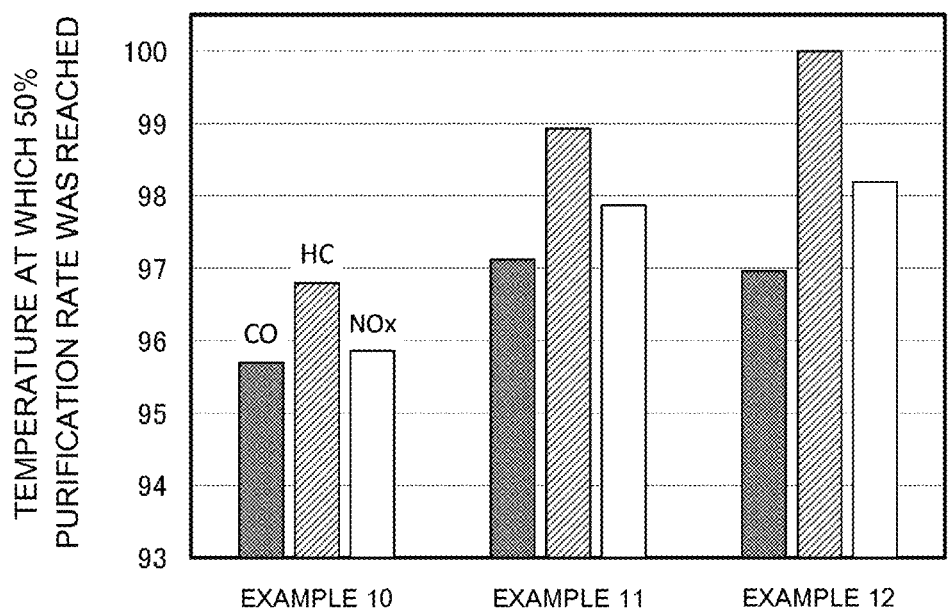
FIG. 9 is a graph comparing temperatures at which a 50% purification rate was reached in examples.

The exhaust gas purification catalyst bodies of the examples were installed in an exhaust system of an engine bench, a simulated exhaust gas was caused to enter while the temperature of an inflowing gas for a catalyst was increased from 150° C. at a heating rate of 50° C./min using a heat exchanger, and a CO concentration, an HC concentration and a NOx concentration on the outlet side of the catalyst were measured. Then, the temperature at which the concentration of each gas on the outlet side reached 50 mol % with respect to the concentration of the inflowing gas (a temperature at which a 50% purification rate was reached) was evaluated. The results are shown in FIG. 9, and show relative values when the temperature at which a 50% purification rate was reached of HC of Example 12 was set as 100. Here, regarding the temperature at which a 50% purification rate was reached, a lower temperature indicates more excellent purification performance because exhaust gas component can be purified at a lower temperature.

<Evaluation of OSC>

The oxygen storage/release capacity (OSC) of the exhaust gas purification catalyst bodies of the examples was evaluated. Specifically, the exhaust gas purification catalyst bodies of the examples were attached to an exhaust system of an engine. In addition, an $O_2$ sensor was attached to a position downstream of each sample. Then, while the air-fuel ratio A/F of a mixed gas supplied to the engine was periodically switched between rich and lean every predetermined time, the amount of average oxygen storage/release (OSC) was calculated from the movement delay of the $O_2$ sensor. The results are shown in FIG. 10 and show relative values when the amount of OSC of Example 12 was set as 100.

<PM Collection Rate>

The PM collection performance of the exhaust gas purification catalyst bodies of the examples was evaluated. Specifically, the exhaust gas purification catalyst bodies of the examples and a filter (only a base) not including a catalyst layer were attached to an exhaust system of an engine. The operation condition of the engine was set in a Worldwide harmonized Light duty driving Test Procedure (WLTP) Phase4 mode. Then, the amount X of PM discharged through the exhaust gas purification catalyst body and the amount Y of PM discharged when the catalyst body was removed were measured, and the PM collection rate was calculated according to $[(X-Y)/X] \times 100$. The results are shown in FIG. 11 and show relative values when the PM collection rate of the filter (only a base) in which no catalyst layer was formed was set as 100.

Figure 10:
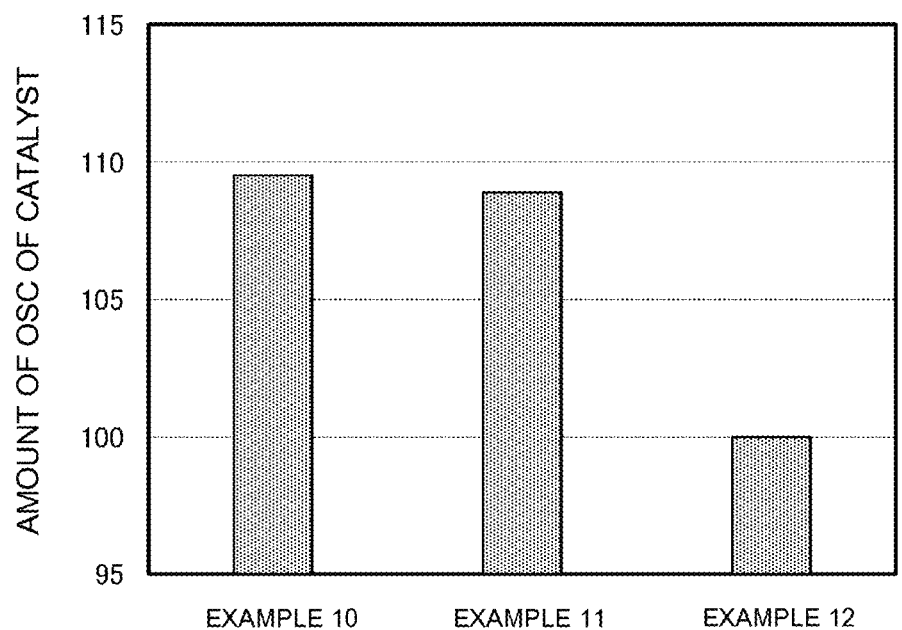
FIG. 10 is a graph comparing amounts of OSC of catalysts in examples.
Figure 11:
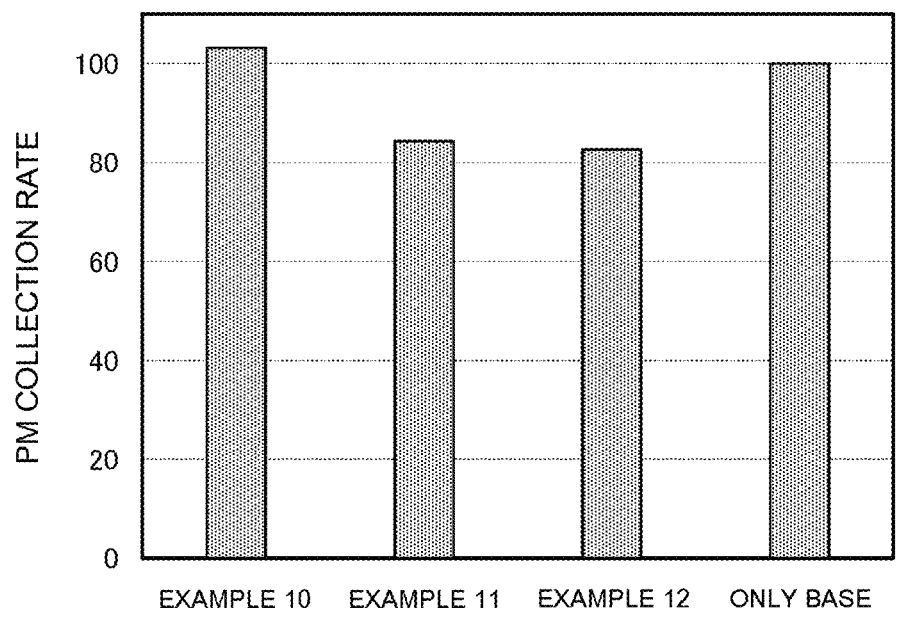
FIG. 11 is a graph comparing PM collection rates in examples.

As shown in Table 2 and FIG. 9 to FIG. 11, the catalyst body of Example 10 in which the relationship of the average filling rate A of the catalyst layer held in pores having a pore diameter of 5 μm or more and less than 10 μm, the average filling rate B of the catalyst layer held in pores having a pore diameter of 10 μm or more and less than 20 μm, and the average filling rate C of the catalyst layer held in pores having a pore diameter of 20 μm or more was A<B<C, A 40%, B 40%, and the proportion of pores having a catalyst layer filling rate of 75% or more among pores having a pore diameter of 5 μm or more and less than 20 μm was 35% or less by number showed better results in the temperature at which a 50% purification rate was reached and the amount of OSC of the catalyst than those of Examples 11 and 12. In addition, the catalyst body of Example 10 showed also better results in the PM collection rate than those of Examples 11 and 12. Based on the results, it was confirmed that, according to the exhaust gas purification catalyst body in which the average filling rates of the catalyst layer satisfied A<B<C, A≤40%, and B≤40%, and the proportion of pores having a filling rate of 75% or more among pores having a pore diameter of 5 μm or more and less than 20 μm was 35% or less by number, it was thereby possible to increase both the PM collection performance and exhaust gas purification performance to a higher level. Here, in the catalyst body of Example 10, the PM collection rate was further improved compared to the case using only the base. In the catalyst body of Example 10, the catalyst layer was disposed preferentially in large pores rather than small pores, compared to the case using only the base, the volume of small pores advantageous for PM collection increased (refer to FIG. 8). This is considered to have contributed to improving the PM collection rate.

While various modified examples of the exhaust gas purification catalyst body 100 and the exhaust gas purification device 1 including the catalyst body 100 have been exemplified above, the structures of the exhaust gas purification catalyst body 100 and the exhaust gas purification device 1 are not limited to the above embodiments.

For example, in the above embodiment, in the length direction of the base, the length $L_A$ of the part in which the upstream catalyst layer 20A is formed is larger than the length $L_B$ of the part in which the downstream catalyst layer 20B is formed. However, the configuration of the catalyst layer 20 is not limited thereto. For example, the length $L_B$ of the part in which the downstream catalyst layer 20B is formed may be longer than the length $L_A$ of the part in which the upstream catalyst layer 20A is formed. In addition, the slurry may be injected once to form the catalyst layer 20 without separating into the upstream catalyst layer 20A and the downstream catalyst layer 20B. In this case also, when the average filling rates A, B, and C of the catalyst layer held in pores for the respective pore diameter ranges satisfy the above relationship and the proportion of pores having a filling rate of 75% or more among pores having a pore diameter of 5 μm or more and less than 20 μm is 35% or less by number, it is thereby possible to increase both the PM collection performance and exhaust gas purification performance to a higher level.

In addition, members of the exhaust gas purification device 1, and the shape and structure of parts may be changed. In the example shown in FIG. 1, the catalyst part 5 is provided upstream from the filter part 6, but the catalyst part 5 may be omitted. The exhaust gas purification device 1 is particularly suitable as, for example, a device that removes harmful components in exhaust gas having a relatively high exhaust gas temperature such as a gasoline engine. However, the exhaust gas purification device 1 according to the present invention is not limited to an application for purifying harmful components in exhaust gas of a gasoline engine, but can be used for various applications for purifying harmful components in exhaust gas discharged from other engines (for example, a diesel engine).

REFERENCE SIGNS LIST

1 Exhaust gas purification device
10 Base
12 Inlet side cell
14 Outlet side cell
16 Partition wall
18 Internal pore
20 Catalyst layer
20A Upstream catalyst layer
20B Downstream catalyst layer
100 Exhaust gas purification catalyst body

The invention claimed is:

1. An exhaust gas purification catalyst body which is disposed in an exhaust passage of an internal combustion engine and purifies exhaust gas discharged from the internal combustion engine, comprising:
   a base of a wall flow structure having an inlet side cell in which an end on the exhaust gas inflow side is open, an outlet side cell which is adjacent to the inlet side cell and in which an end on the exhaust gas outflow side is open, and a porous partition wall that partitions the inlet side cell and the outlet side cell; and
   a catalyst layer that is formed in the partition wall, wherein
   the catalyst layer is formed in a region of at least 50% of the thickness of the partition wall from a surface of the partition wall that faces at least one cell of the inlet side cell and the outlet side cell, and held on the surface of internal pores in the partition wall in the region, and,
   among internal pores in the partition wall, an average filling rate A of the catalyst layer held in pores having a pore diameter of 5 μm or more and less than 10 μm, an average filling rate B of the catalyst layer held in pores having a pore diameter of 10 μm or more and less than 20 μm, and an average filling rate C of the catalyst layer held in pores having a pore diameter of 20 μm or more satisfy the following relationships:
   A <B<C;
   A ≤40%;

B ≤40%,
and among pores having a pore diameter of 5 μm or more and less than 20 μm, a proportion of pores having a catalyst layer filling rate of 75% or more is 35% or less by number.

2. The exhaust gas purification catalyst body according to claim 1, wherein the average filling rate C of the catalyst layer held in the pores having a pore diameter of 20 μm or more is C ≤45%.

3. The exhaust gas purification catalyst body according to claim 1, wherein the average filling rate B of the catalyst layer held in the pores having a pore diameter of 10 μm or more and less than 20 μm is 3% or more larger than the average filling rate A of the catalyst layer held in pores having a pore diameter of 5 μm or more and less than 10 μm.

4. The exhaust gas purification catalyst body according to claim 1, wherein the average filling rate C of the catalyst layer held in pores having a pore diameter of 20 μm or more is 1% or more larger than the average filling rate B of the catalyst layer held in pores having a pore diameter of 10 μm or more and less than 20 μm.

5. The exhaust gas purification catalyst body according to claim 1, wherein the average filling rate A is 10%≤A ≤35%, the average filling rate B is 15%≤B ≤40%, and the average filling rate C is 20%≤C ≤45%.

6. The exhaust gas purification catalyst body according to claim 1, wherein a sum of volumes of pores having a diameter of 10 μm or less measured in the base including the catalyst layer using a mercury injection method is larger than a sum of volumes of pores having a diameter of 10 μm or less measured in the base only (without a catalyst layer) using a mercury injection method.

7. The exhaust gas purification catalyst body according to claim 1, wherein the internal combustion engine is a gasoline engine.

* * * * *